United States Patent [19]

Casey et al.

[11] Patent Number: 4,626,302
[45] Date of Patent: Dec. 2, 1986

[54] TIRE BUILDING APPARATUS AND METHOD

[75] Inventors: William R. Casey; Robert P. Loser, both of Akron; Michael W. Smith, Brimfield; Terry J. Waibel, Seville, all of Ohio

[73] Assignee: The Goodyear Tire & Rubber Company, Akron, Ohio

[21] Appl. No.: 653,215

[22] Filed: Sep. 24, 1984

[51] Int. Cl.$^4$ .................................. B29D 30/26
[52] U.S. Cl. .................................. 156/133; 156/135; 156/398; 156/414; 156/417
[58] Field of Search ............ 156/394.1, 398, 414–420, 156/133–135

[56] References Cited

U.S. PATENT DOCUMENTS

| | | | |
|---|---|---|---|
| 1,921,473 | 8/1933 | Mather | 156/415 |
| 1,987,926 | 1/1935 | DeSautels | 156/414 |
| 2,980,160 | 4/1961 | Deibel | 156/415 |
| 3,234,070 | 2/1966 | Pouilloux | 156/416 |
| 3,607,558 | 9/1971 | Nebout | 156/415 |
| 3,647,598 | 3/1972 | Gazuit | 156/415 |
| 3,787,262 | 1/1974 | Appleby et al. | 156/123 |
| 4,425,180 | 1/1984 | Samokhvalov et al. | 156/415 |
| 4,445,962 | 5/1984 | Felder | 156/414 |

FOREIGN PATENT DOCUMENTS 466125  4/1975  U.S.S.R. ..................... 156/414

Primary Examiner—Lois E. Boland
Attorney, Agent, or Firm—Frederick K. Lacher; T. P. Lewandowski

[57] ABSTRACT

A tire carcass (55) is built on a generally cylindrical drum (10) rotatable about an axis (12) by applying green tire components (50) to the cylindrical surface (14) and curved shoulder surfaces (32,34) of the drum (10). The radially inner surfaces (58) of the lower sidewalls (56) of the tire carcass (55) are formed on the surfaces (32,34) of the curved shoulders (28,30) which have a curvature which can be generated as a segment of a conic section which is at an angle other than a right angle to the axis of a cone. The curvature for each of the lower sidewall inner surfaces (58) as measured along a line of intersection (36) of a shoulder surface (32,34) of the drum (10) and a radial plane (A—A) containing the drum axis (12) is decreased from positions (38) adjacent the axially outer edges (40) of the drum (10) to positions (42) on the cylindrical surface (14) of the drum. As a result, there is minimum change in the shape of the lower sidewalls (56) during shaping of the tire carcass (55) to the cured shape of the tire.

9 Claims, 6 Drawing Figures

TIRE BUILDING APPARATUS AND METHOD

This invention relates generally to the building of tires and especially to the forming of the lower sidewalls on the shoulders of the tire building drum.

Heretofore, the lower sidewalls of the tire have been formed on a tire building drum having a rounded edge with a single, relatively small, radius. When the green tires have been removed from the drum and shaped to the cured shape, the bending of the lower sidewalls has been concentrated in the relatively short length of the bending zone. This has resulted in a concentrated compression of the outer portions of the lower sidewalls during shaping of the tire.

The present invention is directed to a method of building a tire and to a tire building drum in which the lower sidewalls of the tire carcass are formed by the shoulder surfaces of the drum so that they more closely approximate the cured shape. Then during shaping, the compression of the outer portions of the lower sidewalls is minimized by dispersion of the compression forces over the substantial length of the bending zone.

In accordance with an aspect of the invention, there is provided a tire building drum rotatable about a drum axis comprising a generally cylindrical surface having shoulders at axially spaced-apart edges thereof, each of the shoulders having a curved shoulder surface for supporting a lower sidewall of a tire carcass built on the drum, the shoulder surface being curved and defining a line of intersection of the shoulder surface and a radial plane containing the drum axis which has a curvature that can be generated as a segment of a conic section disposed at an angle other than a right angle to the axis of a cone for increasing the radius of the line of intersection from a first position adjacent an axially outer edge of the drum to a second position adjacent the cylindrical surface of the drum whereby during shaping of the tire carcass built on the drum and bending of the lower sidewall the compressive forces are dispersed in the outer portion of the lower sidewall between the first position and the second position.

In accordance with another aspect of the invention, there is provided a method of making a tire carcass comprising:

(a) rotating a generally cylindrical tire building drum about a drum axis;

(b) applying green tire components to said tire building drum;

(c) forming a generally cylindrical radially inner surface of said components on a cylindrical central part of said drum;

(d) forming curved radially inner surfaces of said lower sidewalls on curved shoulder surfaces of said drum with each of said radially inner surfaces of said lower sidewalls having a line of intersection of each of said shoulder surfaces with a radial plane containing said drum axis and said line of intersection having a curvature that can be generated as a segment of a conic section disposed at an angle other than a right angle to the axis of a cone for increasing the radius of curvature of each of said inner surfaces of said lower sidewalls from first position at the axially outer edge of said tire carcass to a second position on said cylindrical inner surface;

(e) removing said tire carcass from said tire building drum; and (f) shaping said tire carcass to a generally toroidal form by bending said lower sidewalls so that compressive forces resulting from said bending are dispersed in outer portions of said lower sidewalls between said first and second positions providing a generally flat contour.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

Figure 1:
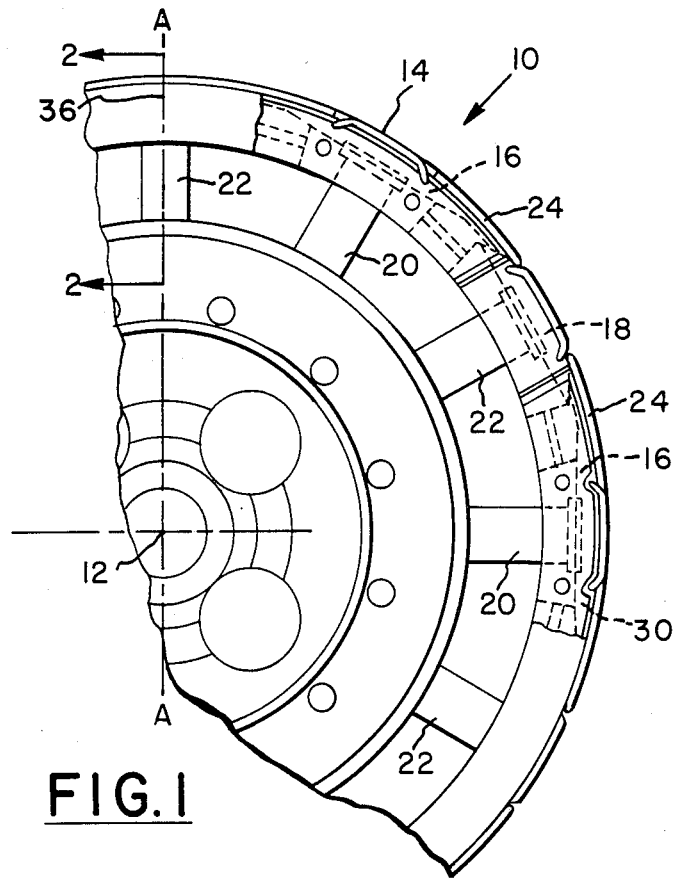
FIG. 1 is a schematic side elevation of a segmental tire building drum embodying the invention with parts being broken away.
Figure 2:
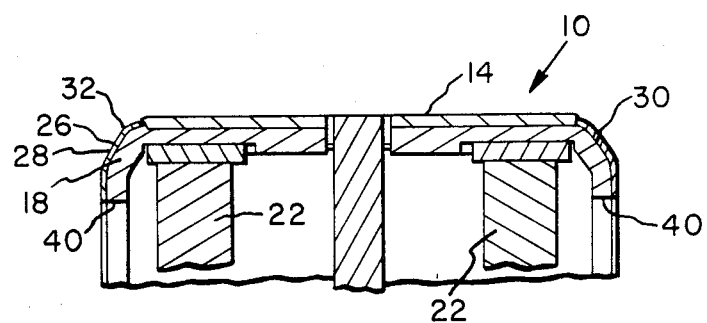
FIG. 2 is a fragmentary sectional view taken along line 2—2 in FIG. 1.

Referring to FIGS. 1 and 2, a tire building drum 10 embodying the invention is shown. The drum 10, which may be segmental, is generally cylindrical and rotatable about a drum axis 12. A generally cylindrical drum surface 14 comprises the surfaces of alternate wide segments 16 and narrow segments 18 extending in overlapping relation around the circumference of the drum 10 and supported on radially extending rods 20 and 22, respectively. Cover plates 24 and 26 may be fastened to the outer surfaces of the wide segments 16 and narrow segments 18, respectively, to overlap adjacent segments and provide the smooth uninterrupted drum surface 14. The wide segments 16 and narrow segments 18 are movable radially to contract and expand the drum 10 in a manner well known to those skilled in the art.

Figure 3:
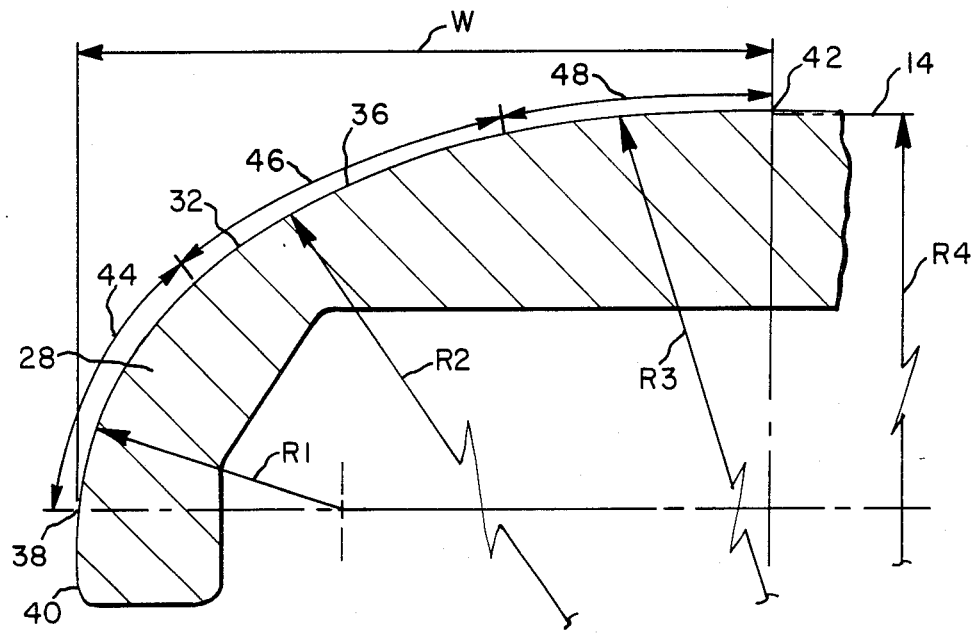
FIG. 3 is an enlarged sectional view like FIG. 2 showing a shoulder of one of the segments of the drum of FIG. 1.

Referring to FIG. 2, the generally cylindrical drum surface 14 connects axially spaced-apart shoulders 28 and 30 having curved shoulder surfaces 32 and 34, respectively. In accordance with this invention, a line of intersection 36 of the shoulder surface 32 and a radial plane A—A containing the drum axis 12 for the tire building drum 10, as shown in FIGS. 1 and 3, has a curvature which can be generated as a segment of a conic section such as a parabola, ellipse or hyperbola which is at an angle other than a right angle to the axis of a cone so that the radius of the line is increased from a first position 38 adjacent an axially outer edge 40 of the drum to a second position 42 on the cylindrical drum surface 14. In the embodiment shown in FIGS. 3 and 5, the line of intersection 36 is generally parabolic and comprises a radially inner curve portion 44 having a radius R1, an intermediate curve portion 46 having a radius R2 and an outer curved portion 48 having a radius R3. The radii R1, R2 and R3 have been chosen so that the curvature of the line of intersection 36 approximates a segment of a parabola. The radius R1 is smaller than the radius R2 which is smaller than the radius R3.

In this embodiment, radius R4 of the drum surface 14 with the drum 10 in the building condition is 12.88 inches (32.71 cm) and the shoulder width W is 2.25 inches (5.08 cm). The radius R1 of the inner curved portion 44 is 0.812 inches (2.06 cm), the radius R2 of the intermediate curved portion 46 is 1.962 inches (4.98 cm) and the radius R3 of the outer curved portion 48 is 3.662 inches (9.30 cm). Preferably the radius R2 of the intermediate curved portion 46 is at least twice the radius R1 of the inner curved portion 44 and the radius R3 of the outer curved portion 48 is at least four times the radius R1 of the inner curved portion.

Figure 5:
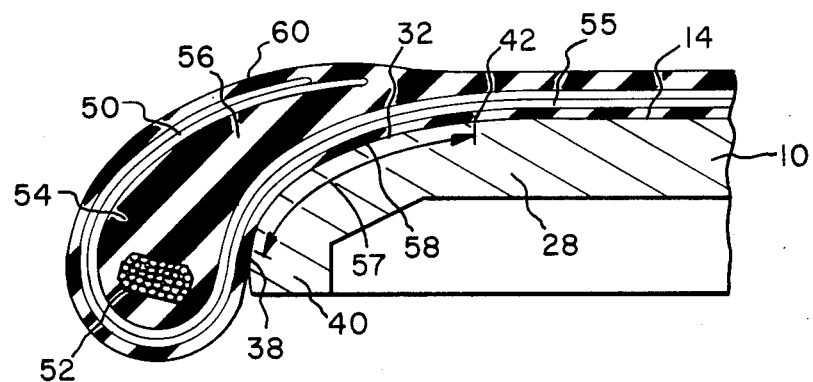
FIG. 5 is a fragmentary sectional view of a tire building drum shoulder of this invention showing the lower sidewall of the tire carcass formed in accordance with the method of this invention.

In operation, the wide segments 16 and narrow segments 18 are moved radially outward by the rods 20 and 22 to the building position shown in FIGS. 1 and 5 with the drum surface 14 having the radius R4. The drum 10 is then rotated about the drum axis 12 and green tire components 50 such as layers of reinforcing plies are applied over the cylindrical drum surface 14 and curved shoulder surfaces 32 and 34. Beads 52 are set at the axially outer edges 40 of the drum 10 and the green tire components 50 are turned up over the beads in a manner well known to those skilled in the art to form a tire carcass 55.

As shown in FIG. 5, this provides a lower sidewall 56 at one side of the tire carcass 55 having a bending zone 57 corresponding to the radially inner curved portion 44, intermediate curved portion 46 and outer curved portion 48 of the line of intersection 36 of the drum 10. Accordingly, the lower sidewall 56 is formed with a radially inner surface 58 having a curvature which can be generated as a segment of a conic section which is at an angle other than a right angle to the axis of a cone along the line of intersection 36 of the drum 10. An outer portion 60 of the lower sidewall 56 is formed with a surface generally conforming to the inner surface 58. The other lower sidewall 56 (not shown) on the other side of the tire carcass 55 is formed in the same manner. The cylindrical inner surface of the tire carcass 55 is formed on the cylindrical drum surface 14. Then the wide segments 16 and narrow segments 18 are moved radially inward by the rods 20 and 22 to provide a contracted drum surface over which the tire carcass 55 can be removed.

Figure 6:
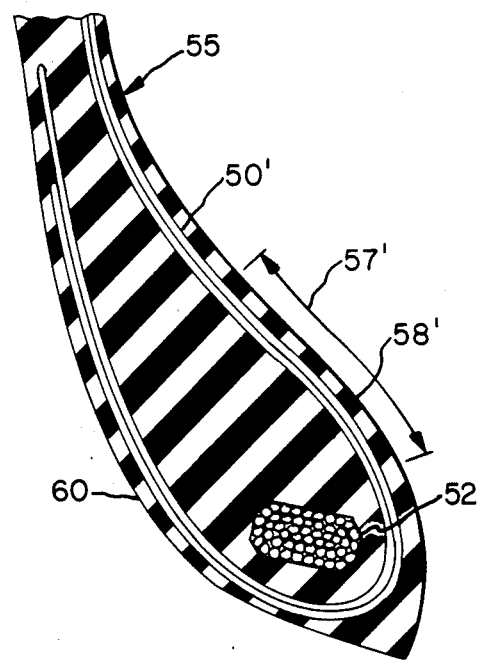
FIG. 6 is a fragmentary sectional view of the lower sidewall of the tire in the cured shape.

The tire carcass 55 is then shaped into the cured shape shown in FIG. 6 with the curvature of the radially inner surface 58' changed from the curvature of the radially inner surface 58 shown in FIG. 5 to the generally flat contour shown in FIG. 6. The beads 52 are in relatively the same positions; however, the lower sidewall 56' is rotated around the beads to the position shown in FIG. 6. As can be seen, the deformation in the outer portion 60 due to the change in shape from the building shape to the cured shape has been minimized by forming the lower sidewall 56' with substantially long bending zone 57 having a continuous change in radius of the radially inner surface 58 to eliminate concentrated bending at any particular point.

Figure 4:
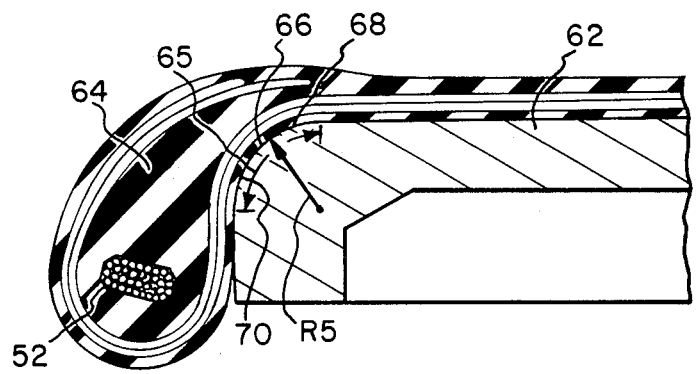
FIG. 4 is a fragmentary sectional view of a prior art tire building drum shoulder with a tire carcass formed on the drum.

The advantages of the invention are apparent from a comparison of a prior art drum 62 shown in FIG. 4 with the drum 10 of this invention shown in FIG. 5. The prior art drum 62 forms a lower sidewall 64 having a relatively short bending zone 65 on a shoulder surface 66 with a line of intersection 68 having a single radius R5. Accordingly a radially inner surface 70 of the lower sidewall 64 is formed in such a manner that there is concentrated bending of the lower sidewall in the relatively short length of the bending zone 65. This results in concentrated compression of the outer portions of the lower sidewall 64 during shaping of the tire.

While a certain representative embodiment and details have been shown for the purpose of illustrating the invention, it will be apparent to those skilled in the art that various changes and modifications may be made therein without departing from the spirit or scope of the invention.

What is claimed is:

1. A tire building drum rotatable about a drum axis comprising a generally cylindrical surface having shoulders at axially spaced-apart edges thereof, each of said shoulders having a curved shoulder surface for supporting a lower sidewall of a tire carcass built on said drum, said shoulder surface being curved and defining a curved line of intersection of said shoulder surface and a radial plane containing said drum axis which has a curvature that can be generated as a segment of a conic section disposed at an angle other than a right angle to the axis of said cone for increasing the radius of curvature of said line of intersection from a first position adjacent an axially outer edge of said drum to a second position adjacent said cylindrical surface of said drum whereby during shaping of said tire carcass built on said drum and bending of said lower sidewall the compressive forces are dispersed in the outer portions of said lower sidewall between said first position and said second position.

2. The tire building drum of claim 1 wherein said shoulder surface is curved so that said curved line of intersection has at least two connected curved portions with a radially inner portion located adjacent one of said axially outer edges and having a radius of curvature smaller than a radius of curvature of a radially outer portion located adjacent said cylindrical surface.

3. The tire building drum of claim 2 wherein an intermediate curved portion is located between said inner curved portion and said outer curved portion, said intermediate curved portion having a radius of curvature greater than the radius of curvature of said inner curved portion and less than the radius of curvature of said outer curved portion.

4. The tire building drum of claim 3 wherein said curved line of intersection is generally parabolic and the radius of curvature of said intermediate curved portion is at least twice the radius of curvature of said inner curved portion and said radius of curvature of said outer curved portion is at least four times the radius of curvature of said inner curved portion.

5. The tire building drum of claim 4 wherein said drum cylindrical surface has a radius of curvature of 12.88 inches (32.71 cm) in the building condition, said inner curved portion has a radius of curvature of 0.812 inches (2.06 cm), said intermediate portion has a radius of curvature of 1.962 inches (4.98 cm) and said outer portion has a radius of curvature of 3.662 inches (9.30 cm).

6. The tire building drum of claim 1 wherein said drum is separated into segments with each of said segments being movable radially to expand and contract said cylindrical surface, said segments being in a radially outer expandable position for building tires and in a radially inner contracted position for removing said tires and each of said segments including a part of said curved shoulder surface.

7. A method of making a tire carcass comprising:
   (a) rotating a generally cylindrical tire building drum about a drum axis;

(b) applying green tire components to said tire building drum;

(c) forming a generally cylindrical radially inner surface of said components on a cylindrical central part of said drum;

(d) forming curved radially inner surfaces of said lower sidwalls on curved shoulder surfaces of said drum with each of said radially inner surfaces of said lower sidewalls having a curved line of intersection of each of said shoulder surfaces with a radial plane containing said drum axis and said line of intersection having a curvature that can be generated as a segment of a conic section disposed at an angle other than a right angle to the axis of said cone for increasing the radius of curvature of each of said inner surfaces of said lower sidewalls from a first position at the axially outer edge of said tire carcass to a second position on said cylindrical inner surface;

(e) removing said tire carcass from said tire building drum; and (f) shaping said tire carcass to a generally toroidal form by bending said lower sidewalls so that compressive forces resulting from said bending are dispersed in outer portions of said lower sidewalls between said first and second positions providing a generally flat contour.

8. A method of claim 7 wherein each of said lower sidewalls of said tire carcass is formed with a radially inner surface having a curvature of said curved line of intersection including at least two connected curved portions, said portions comprising a radially inner portion located adjacent one of said outer edges of said tire carcass and a radially outer portion located adjacent said cylindrical inner surface of said tire carcass and said inner portion having a radius of curvature smaller than the radius of curvature of said outer portion.

9. The method of claim 8 wherein said inner surface has a curvature of said curved line of intersection including an intermediate portion between said radially inner portion and said outer portion and said intermediate portion having a radius of curvature greater than the radius of curvature of said inner portion and less than the radius of curvature of said outer portion.

* * * * *